United States Patent
Joffre et al.

(10) Patent No.: US 9,963,235 B2
(45) Date of Patent: May 8, 2018

(54) AIRCRAFT BENCH ORGANIZED TO RECEIVE A VARIABLE NUMBER OF PASSENGERS

(71) Applicant: AIRBUS HELICOPTERS, Marignane (FR)

(72) Inventors: Jean-Francois Joffre, Martigues (FR); Ernesto Almeida-Gonzalez, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 424 days.

(21) Appl. No.: 14/859,495

(22) Filed: Sep. 21, 2015

(65) Prior Publication Data

US 2016/0083095 A1      Mar. 24, 2016

(30) Foreign Application Priority Data

Sep. 23, 2014   (FR) .................................... 14 02130

(51) Int. Cl.
*B64D 11/06* (2006.01)
*B64D 25/06* (2006.01)

(52) U.S. Cl.
CPC ........ *B64D 11/062* (2014.12); *B64D 11/0619* (2014.12); *B64D 11/0647* (2014.12); *B64D 11/0693* (2013.01); *B64D 25/06* (2013.01); *Y02T 50/46* (2013.01)

(58) Field of Classification Search
CPC .. B64D 11/062; B64D 11/0647; B64D 25/06; B64D 11/0619

USPC ........................................................ 244/122
See application file for complete search history.

(56) References Cited

U.S. PATENT DOCUMENTS

| | | |
|---|---|---|
| 2,799,323 A | 7/1957 | Berg |
| 5,125,598 A | 6/1992 | Fox |
| 5,657,950 A | 8/1997 | Han et al. |
| 5,692,705 A | 12/1997 | Bellais |

(Continued)

FOREIGN PATENT DOCUMENTS

| | | |
|---|---|---|
| DE | 4312343 | 10/1994 |
| EP | 0423348 | 4/1991 |

(Continued)

OTHER PUBLICATIONS

French Search Report for FR 1402130, Completed by the French Patent Office dated May 20, 2015, 7 Pages.

(Continued)

*Primary Examiner* — Brian M O'Hara
*Assistant Examiner* — Keith L Dixon
(74) *Attorney, Agent, or Firm* — Brooks Kushman P.C.

(57) ABSTRACT

An aircraft bench having passenger-receiving locations each defined by two seating plates for receiving a respective buttock of a passenger. Each of the seating plates is individually mounted to pivot on a front spar of the bench and each is individually supported in suspension via its rear edge by a respective energy absorber. The bench is fitted with a plurality of adjacent sets of straps that are lockable together in pairs by a buckle, with locking points that are selectively usable for belting in a passenger depending on the passenger-receiving location selected by the passenger.

15 Claims, 4 Drawing Sheets

(56) References Cited

U.S. PATENT DOCUMENTS

| | | | | |
|---|---|---|---|---|
| 5,775,642 | A * | 7/1998 | Beroth | B64D 11/0693 244/118.6 |
| 6,749,266 | B2 * | 6/2004 | Williamson | B64D 11/06 297/248 |
| 6,811,186 | B1 * | 11/2004 | Fraley | B60N 2/4876 280/801.2 |
| 7,364,199 | B2 * | 4/2008 | Elizondo | B60R 22/02 280/801.1 |
| 7,594,701 | B2 | 9/2009 | Kawabata et al. | |
| 7,954,901 | B2 * | 6/2011 | Foye | B60R 22/20 280/801.2 |
| 8,342,300 | B2 * | 1/2013 | Guillon | B60N 2/24 188/275 |
| 8,408,643 | B2 | 4/2013 | Honnorat | |
| 9,382,008 | B2 * | 7/2016 | Fornecker | B64D 11/0619 |
| 9,610,919 | B2 * | 4/2017 | Taubert | B60R 22/20 |
| 2002/0089164 | A1 * | 7/2002 | Rouhana | B60R 22/02 280/801.1 |
| 2003/0173817 | A1 * | 9/2003 | Vits | B60N 2/265 297/484 |
| 2008/0211219 | A1 | 9/2008 | Lamparter | |
| 2009/0267390 | A1 | 10/2009 | Honnorat et al. | |
| 2010/0052378 | A1 * | 3/2010 | Marriott | B60N 2/242 297/216.1 |
| 2010/0270836 | A1 | 10/2010 | Mowry et al. | |
| 2013/0228652 | A1 | 9/2013 | Joffre | |

FOREIGN PATENT DOCUMENTS

| | | |
|---|---|---|
| EP | 0433388 | 6/1991 |
| EP | 0716980 | 6/1996 |
| EP | 2200481 | 5/2011 |
| EP | 2069164 | 7/2012 |
| FR | 2683191 | 5/1993 |
| FR | 2851974 | 9/2004 |
| FR | 2950607 | 4/2011 |
| WO | 9002685 | 3/1990 |
| WO | 2008027832 A2 | 3/2008 |
| WO | 2008027832 A3 | 3/2008 |
| WO | 2009042688 | 4/2009 |

OTHER PUBLICATIONS

Electronic Code of Federal Regulations, 14CFR27.562, Title 14, Parts 27.29, 2002, e-CFR data is current as of Oct. 8, 2015, 2 Pages, "Airworthiness standards: Normal category rotorcraft".

* cited by examiner fig. 12 fig. 11

AIRCRAFT BENCH ORGANIZED TO RECEIVE A VARIABLE NUMBER OF PASSENGERS

CROSS REFERENCE TO RELATED APPLICATION

This application claims priority to French patent application No. FR 14 02130 filed on Sep. 23, 2014, the disclosure of which is incorporated in its entirety by reference herein.

BACKGROUND OF THE INVENTION (1) Field of the Invention

The present invention relates to the field of seats for aircraft, in particular rotorcraft, arranged to provide safety for the passengers installed on the seats in the event sudden deceleration of the aircraft and/or in the event of a crash.

The present invention relates more particularly to the structural organization of a bench for aircraft enabling a variable number of passengers to be received under the safety conditions specifically required of aircraft transporting passengers.

(2) Description of Related Art

Seats for aircraft have means for protecting passengers installed on the seats in the event of the aircraft being subjected to strong deceleration and/or in the event of a crash. For this purpose, aircraft seats are commonly fitted with provisions as set out below.

Firstly, an aircraft seat is commonly fitted with a harness for individually holding a passenger in a seated position on the seat. The harness comprises a set of straps, preferably four straps, including at least two shoulder straps and two lap straps. Each strap is anchored to the seat at one end, possibly via a winder and/or means for adjusting the length of the strap, and each is typically provided with an attachment member at its other end.

The attachment members fitted to the straps commonly co-operate with respective locking members incorporated in a buckle of the harness in a position in which the harness is looped around the passenger to hold the passenger in the seated position on the seat.

The buckle conventionally comprises an actuator operable by the passenger in order to release at least some of the attachment members from the engagement exerted thereon by the locking members, thus enabling the harness looped around the passenger to be opened so that the passenger can leave the seat.

Concerning the organization of such harnesses fitted to aircraft seats, reference may be made for example to the Document FR 2 851 974 (EADS Sogerma Services), which describes such a harness.

Secondly, aircraft seats are organized to avoid, or at least limit, deformation under the effect of deformation of a floor of the aircraft on which the seat is fastened. Such deformation of the floor is caused in particular in the event of an aircraft crashing. For this purpose, aircraft seat architecture is organized so that, in the event of a crash, it accompanies and/or compensates deformation of the floor on which the seats are installed on board the aircraft. Such provisions serve to protect passengers by limiting the impact of deformation of the floor on a seat bucket receiving one or more passengers.

Thirdly, an aircraft seat is provided with one or more energy absorbers suitable for absorbing the energy resulting from the forces to which said bucket is generally subjected in the event of strong deceleration of the aircraft. Such energy absorbers are constituted in particular by deformable means having a predetermined force threshold.

More particularly, a common utilization situation of an aircraft seat should be taken into consideration in which the passengers installed on the seat are not subjected to the effects of strong deceleration of the aircraft. In such a situation, the energy absorbers support without deforming at least the seat pan of the seat and possibly the entire bucket of the seat.

In a critical utilization situation of the seat, the passenger(s) installed on the seat is/are subjected to strong deceleration of the aircraft. Under the effect of the load to which the bucket supporting the weight of the passenger(s) is subjected, the energy absorbers deform on being subjected to a force higher than said force threshold. A change in the dimensions of the deformable means of the energy absorbers, which may equally well be in compression or in elongation, enables at least the seat pan and possibly the entire bucket (pan and back) to move in order to protect the passenger(s) being subjected to the strong deceleration of the aircraft. At the end of the deformation stroke of the energy absorbers, the bucket is retained by the energy absorbers, at least via the seat pan.

By way of example, reference may be made on this topic to the following Documents FR 2 683 191 (Israel Aircraft Ind. Ltd.), DE 4 312 343 (Eurocopter Deutschland), FR 2 950 607 (Eurocopter France), U.S. Pat. No. 5,125,598 (R. G. Fox), and US 2010/0270836 (G. A. Mowry et al.), which documents describe such energy absorbers using deformable means that are activated at a predetermined force threshold to which the bucket is subjected in the event of strong deceleration.

Among aircraft seats, single-occupant seats are known, such as those used by pilots, for example, and benches are also known for receiving a plurality of passengers.

Benches are naturally provided with a plurality of harnesses, the number of harnesses matching the number of passengers as determined by the optimum passenger-receiving capacity of the bench. The respective locations where harnesses are installed on the bench and/or the number of said harness buckles for looping a harness around a passenger conventionally determine the number and the locations identifying the places on the bench that can receive respective passengers.

An aircraft bench commonly has a carrier structure supporting a frame. The frame provides at least one said bucket made up of a seat pan and of a seat back for receiving one or more passengers. The frame may provide a plurality of individual passenger buckets or a collective bucket suitable for receiving a plurality of passengers jointly.

The carrier structure conventionally has a stand typically provided with catches for fastening to a floor of the aircraft, in particular by means of bolts or by co-operation between said catches and rails incorporated in the floor of the aircraft. The stand carries the frame via structural elements of the carrier structure connecting stand members together, such as structural elements made up of uprights and/or of spars.

The energy absorber(s) is/are potentially incorporated in the carrier structure, e.g. being interposed between the stand and said structural element. Reference may be made for example on this topic to the following Documents: EP 0 423 348 (Kiguchi Shigeru et al.) and U.S. Pat. No. 5,657,950 (Ind Technology Research Int. et al.).

Also by way of example, the energy absorber(s) is/are potentially interposed between the carrier structure and the frame. By way of example, reference may be made on this topic to the following Documents EP 0 716 980 (Eurocopter France), U.S. Pat. No. 5,125,598 (R. G. Fox), and US 2010/0270836 (G. A. Mowry et al.).

Concerning the Document US 2010/0270836 (G. A. Mowry et al.), the energy absorber is more particularly formed by a spring carried by the seat pan and placed under stress by means of a wire. The wire engages the spring at one of its ends and the frame at its other end via a pulley around which the wire is wound.

An advantage of benches is that they enable a plurality of passengers to be received while presenting weight and overall size that are small compared with a plurality of seats for individually receiving the same number of passengers. Nevertheless, optimizing the number of passengers who can be received on a bench of the smallest possible size implies restricting the amount of space available on the bench for each of the passengers, to the detriment of their individual comfort.

In this context, it is found that the bench may be occupied by some number of passengers that is smaller than its optimum passenger-receiving capacity. Nevertheless, the locations of the bench reserved for each of the passengers are predetermined by the arrangement of the bench, in the context of constraints associated with making safe the passengers installed on the bench in the event of strong deceleration and/or in the event of the aircraft crashing.

Under such conditions, improving the individual comfort of some number of passengers smaller than the total passenger-receiving capacity of the bench is limited and deserves improving. It should be observed that such an improvement needs to take account of the constant search for lightening a bench in order to reduce its weight as much as possible, which is important in aviation, and also, as mentioned above, needs to take account of making passengers safe when faced with strong deceleration of the aircraft and/or in the event of a crash.

In the general field of transporting passengers on board vehicles, proposals have been made for benches that seek to be light in weight, and possibly also adaptable, so as to be able to receive varying numbers of passengers.

By way of example, according to U.S. Pat. No. 7,594,701 (Conax Florida Corporation), an aircraft bench may comprise a carrier structure provided with means for fastening it both to the floor and to a wall of the aircraft.

According to that U.S. Pat. No. 7,594,701, the carrier structure is covered in a fabric providing an overall seat pan for receiving a plurality of passengers, said fabric being supported by a mesh of straps suitable for being tensioned to a greater or lesser extent on the carrier structure.

Also by way of example, according to Document EP 2 069 164 (Indiana Mills & Mfg.), a vehicle bench provided with safety belts can receive varying numbers of passengers by moving buckles for locking said belts in the looped position along a rail that is installed on the seat.

Still with reference to the comfort of the users of seats, the traditional seat pan of such a seat is a single piece that receives the buttocks of all of the users. It has nevertheless been found that the comfort of users can be improved by subdividing the seat pan of a seat into pairs of individual seat pan members respectively receiving one or the other of a user's buttocks.

Reference may be made on this topic to the seats described by the following Documents: EP 2 200 481 (Massachusetts Inst. Technology), and U.S. Pat. No. 2,799,323 (Berg Joseph), for example.

According to Documents EP 2 200 481 and U.S. Pat. No. 2,799,323, the individual seat pans of a seat are themselves individually movable in order to adapt their orientations as a function of the posture of the user installed on the seat, such that the muscle tensions suffered by the user are limited.

Other documents have been considered, and in particular the specification "Airworthiness standards: Normal category rotorcraft", 14CFR27.562, Title 14, Parts 27.29 (2002), and the following Documents EP 0 433 388, US 2008/211219, US 2009/267390, and US 2013/228652.

BRIEF SUMMARY OF THE INVENTION

In this context, the object of the present invention is to propose an aircraft bench that is organized to receive varying numbers of passengers in the context of safety constraints as they apply to passengers transported by an aircraft, and in particular with respect to strong deceleration of the aircraft and/or in the event of a crash.

The present invention seeks more particularly to propose such a bench for an aircraft that is organized in such a manner as to enable varying numbers of passengers to be received, while significantly improving their comfort, in particular with respect to the spacing between passengers installed on the bench, when the number of passengers is less than the optimum number of passenger-receiving places on the bench.

The object of the present invention is particularly difficult to carry out, in that, since the safety of passengers must be ensured it must be considered that the places available on the bench need to be predefined and clearly identifiable by the passengers.

Consideration should also be given to the possibility of installing an odd number of passengers on a bench having an optimum number of passenger-receiving places that is even, and vice versa. Such a difficulty becomes particularly difficult to overcome when the number of passengers installed on the bench is one passenger fewer than the total number of passenger-receiving places on the bench.

It should also not be forgotten that the total weight of the bench should not be increased nor should its structure be made excessively complex, so as to ensure that a bench is obtained that can be used at a cost that is industrially acceptable. In this context, it is also desirable to obtain said ability to receive a varying number of passengers on the bench while not changing the arrangement of the bench as a function of the number of passengers received on any one occasion.

Furthermore, it is desirable for the provisions made for improving passenger comfort to not interfere with the possibility of folding the seat member(s) towards the seat back, in order to limit the space occupied by the bench when there are no passengers.

In this technological environment, the present invention proposes an aircraft bench of the type conventionally comprising a carrier structure supporting a frame providing a bucket formed by a seat pan and a seat back. The bucket has a predefined plurality of individual locations for receiving passengers.

The carrier structure comprises a stand having catches for fastening the bench in its utilization station. Such a utilization station of the bench typically identifies one of its dimensions extending in elevation from the stand towards the seat back and also, in compliance with the posture of a passenger conventionally received on the bench, a front zone and a rear zone between which the seat pan extends, the seat back being situated at the rear zone of the bench.

The carrier structure also comprises spars, including a "front" spar situated at the front of the bench in its utilization station, and a "rear" spar situated at the rear of the bench in the utilization station. Each of said front spar and said rear spar is mounted on the stand. The frame is pivotally mounted on the carrier structure at least by means of the seat pan pivotally mounted on the stand via the front spar.

The aircraft bench of the present invention also includes a plurality of harnesses, the number of harnesses corresponding to the optimum number of passengers that can be received simultaneously by the bench. Each harness comprises at least four straps, including two shoulder straps and two lap straps. Each strap is anchored to the bench at one of its ends and each is lockable at its opposite end to a buckle at locking points that are predefined so as to enable a harness to be looped around a passenger.

More particularly and in conventional manner, the locking of the straps in the position in which a harness is looped around a passenger is performed by means of a buckle having respective locking points for each of the straps of a given harness for the purpose of belting in a passenger.

As mentioned above, such a buckle is commonplace and conventionally comprises locking members that co-operate with respective attachment members of the straps. The co-operation established by a passenger between the attachment members and the locking members can be undone, at least in part, by actuating a control member incorporated in the buckle.

It should be understood that the number of harnesses fitted to an aircraft bench and determining the optimum number of passengers that can be received simultaneously on the bench, as mentioned above, is conventionally identifiable by the number of buckles fitted to the bench.

The aircraft bench of the present invention also includes a plurality of energy absorbers engaged with the frame. The energy absorbers serve to retain at least the seat pan in the event of strong deceleration of the aircraft against the forces to which the bucket is subjected as generated by at least one passenger received on the bench. The energy absorbers may each conventionally be arranged as a deformable member, i.e. each can be changed in shape, e.g. in extension or in compression, when the forces to which the bucket is subjected are greater than a predefined force threshold.

In such a technological environment, the bench of the present invention is mainly recognizable in that it includes the provisions set out below.

The seat pan is subdivided in the direction in which the front spar extends into a plurality of adjacent seat plates. In particular, each seat plate withstands twisting and bending relative to a predefined stress threshold. Two adjacent seat plates together provide a said location for receiving an individual passenger by individually receiving respective ones of the passenger's buttocks.

In addition, each seat plate is individually mounted on the carrier structure so as to be movable in pivoting, each being individually pivotally mounted more particularly at its front edge to the stand by means of the front spar. Each of the seat plates is also individually supported in suspension at its opposite rear edge by at least one said energy absorber. Each of said energy absorbers is associated with a seat plate by being engaged with the carrier structure, for example, but as specified below preferably by being engaged with the seat back.

Furthermore, it is proposed to take into consideration a distribution of the straps of each of the harnesses as two distinct sets of straps, each comprising a shoulder strap and a lap strap, each set of straps serving to belt in a passenger on a respective one of the passenger's sides.

When considering the straps of each of the harnesses as being distributed in this way, the straps of a "middle" set of straps that are placed adjacent between any two sets of straps referred to as "neighboring" sets, are jointly lockable to a common buckle, selectively with one or the other of said neighboring sets of straps by means of respective combinations of locking points of the buckle that are identified depending on the relative positions between the sets of straps co-operating with the same buckle.

In this context, the various sets of straps co-operate in pairs with a common buckle depending on the locations selected by the passengers, each of which locations has two adjacent seat plates.

Three successively adjacent seating plates define in pairs two passenger-receiving locations. In addition, three successively adjacent sets of straps used in respective pairs for belting in a passenger on respective sides are suitable for belting in a passenger regardless of the location selected by the passenger making use of two any adjacent seating plates.

It should be observed that the arrangement and the installation of the harnesses on the bench naturally constrain a passenger to use a location of the bench that is made up of any two adjacent seat plates.

Furthermore, the plane shape of the seat plates and a small distance separating two adjacent seat plates provides a substantially continuous plane for the seat of the bench so as to secure sitting comfort for a passenger regardless of which two adjacent seat plates the passenger uses.

It can be seen from these provisions that an even number $N_1$ of seat plates fitted to the bench determine a number $N_2$ of first passenger-receiving locations, where $N_2$ is equal $N_1/2$, which number identifies the optimum number of passengers that can be received simultaneously on the bench. Said number $N_2$ also corresponds to the optimum number of harnesses that can be used simultaneously by the passengers, said number $N_2$ being identifiable in particular by the number of harness buckles that are fitted to the bench.

In addition, a number $N_3$ of second passenger-receiving locations is defined by making use of two adjacent seat plates that otherwise contribute respectively to two adjacent ones of said first passenger-receiving location.

Finally, it can be seen from these provisions that the bench has an optimized number $N_4$ of passenger-receiving locations of different structure that can be used selectively by the passengers, said number $N_4$ being greater than the number $N_2$ of first passenger-receiving locations. In particular, consideration may be given to:

a first passenger-receiving configuration in which the bench receives said optimum number $N_2$ of passengers, the passengers being seated side by side and using all of the seat plates and all of the sets of harness straps;

a second passenger-receiving configuration in which the bench receives said number $N_3$ less than the number $N_2$ of passengers, the passengers being capable of using as needed any two adjacent seat plates and two adjacent strap sets co-operating with a single buckle so that together they belt in a single passenger. In this second passenger-receiving configuration, comfort space is then left between two adjacent passengers who are separated from each other by an unused seat plate.

Said comfort space is also advantageously obtained:

without affecting the safety of the passengers installed on the bench, regardless of their number, since each seat plate is individually supported in suspension by its own energy absorber(s) and the passengers can be belted in with four straps, including two shoulder straps two lap straps, regardless of the respective passenger-receiving locations of the bench that receive them;

without being subjected to any constraint to modify the configuration and/or the arrangement of the bench between said first passenger-receiving configuration and said second passenger-receiving configuration.

More particularly, the passengers installed on the bench in any number, naturally not exceeding said number $N_2$ corresponding to the optimum number of passenger-receiving locations of the bench, can sit freely in any passenger-receiving location of the bench as defined by two neighboring seat plates without taking any particular action on any member of the bench for the purpose of modifying its arrangement and/or its configuration, other than the ordinary action of making two adjacent sets of straps co-operate so that their straps are locked to a common buckle in order to loop a harness around a passenger. Without excessively complicating the structure of the bench, with the advantage of making the cost of obtaining the bench industrially and commercially acceptable, and without significantly increasing its weight.

It should also be observed that the generally plane overall shape of the seat pan as a whole of the bench conventionally provides a saving in the size of the bench.

Nevertheless, these provisions of the invention enable such a saving in size to be obtained while still procuring individualized protection for the passengers, including in the event of strong deceleration of the aircraft causing individualized deformation of the energy absorbers supporting the respective seat plates. The individualized deformation of the energy absorbers is caused by the weight of the passenger using the seat plates supported by the energy absorbers associated therewith.

In an astute configuration, the buckles are of the type in which each has five locking points, specifically:

a "permanent" locking point for permanently locking one of the straps of any one of the sets of straps, preferably a lap strap, referred to as the "first" set to the buckle; and four "temporary" locking points for temporarily locking the other strap of the first set of straps and the straps of either one of the two sets of straps adjacent to the first set of straps selectively to the buckle in the position for looping a harness around a passenger, the locking taking place via three temporarily locking points respectively identified depending on the relative position of the sets of straps used for belting in the passenger.

The passenger can use any two adjacent sets of straps for being belted in by a harness regardless of which two adjacent seat plates the passenger is using, and can do so in the usual way by locking the straps to the appropriate temporary locking points of the buckle.

It should be observed that it is unusual to have a buckle with five locking points conventionally comprising a permanent locking point and four temporary locking points for the purpose of locking no more than four straps making up a harness for belting a passenger in a sitting position on the bench, with the temporary locking points being used in selective manner depending on the location selected by the passenger. Such a buckle having five locking points is itself known for conventionally locking the straps of a harness that has five straps, with four straps that are locked temporarily on the temporary locking points and one strap, commonly a crotch strap, that is permanently locked to the buckle.

As is common practice for harnesses fitted to aircraft seats, permanently locking one of the straps of a harness serves to ensure that the buckle remains permanently attached to the bench in order to ensure it does not become separated therefrom.

A passenger is enabled to make selective use of the sets of straps needed for belting in merely by moving the buckle that is used by the passenger. The passenger moves the buckle by virtue of the flexibility of the strap that is permanently locked to the buckle, and by turning the buckle so as to place the locking points in appropriate positions depending on the sets of straps actually used by the passenger.

In a general approach to the invention, the energy absorbers are potentially deformable individually, which may take place equally well in extension or in compression, conventionally depending on the structural organization and/or the technique for engaging the energy absorbers respectively with the seat plates and with the carrier structure or the seat back.

In this context, it should be understood that the energy absorbers may be of any known arrangement, e.g. arranged as a shock absorber, a compression spring, and/or a member having a deformable mass, with the ease with which said deformable mass can be deformed possibly resulting from the material from which it is made and/or from its shape.

Nevertheless, it is preferable to restrict as much as possible the size and/or the weight of the energy absorbers, in particular because a large number of them are fitted to the bench as a result of each of the seat plates being supported by at least one energy absorber.

In a preferred embodiment, each energy absorber comprises a wire closed in a loop and capable of withstanding deformation equally well in extension and/or in compression under the effect of the energy absorber being put into operation.

In this context, it should be understood that the wire withstands deformation in extension and/in compression intrinsically, e.g. because the wire is made of a metal material. In other words, the characteristics of the wire forming a given energy absorber, in particular concerning the material from which it is made and/or its dimensions and/or it shape gives it intrinsic ability to withstand deformation in extension and/or in compression.

Naturally, said intrinsic ability of the wire to withstand deformation is to be taken into consideration when the wire is subjected to a force that is at least less than or equal to, or possibly slightly greater than the maximum forces to which the wire may potentially be subjected under the effect of the energy absorber operating in the event of strong deceleration of the aircraft. In other words, the intrinsic ability of the wire to withstand deformation enables it to withstand deformation in extension and/or in compression under the effect of the energy absorber being used as a result of the forces to which the bucket is subjected in the event of strong deceleration of the aircraft.

In this context, between the ends of said loop formed by the wire, the wire is wound tightly around a pulley that is rotatably mounted on a bearing fastened to the seat back. One of the ends of the loop, referred to as its "proximal" ends, is fastened to a seat plate associated with the wire. The other end of the loop, referred to as its "distal" end, is free, being arranged above the pulley in the absence of the wire withstanding forces less than said force threshold that determines when the energy absorber is put into operation.

Furthermore, the wire is provided with means for retaining the distal end of the loop against the pulley at the end of the stroke of the wire caused by the energy absorber being put into operation as a result of the forces supported by the seat plate in the event of strong deceleration of the aircraft.

The advantageous structural simplicity should be observed of the energy absorbers, each arranged as a wire shaped into a loop, serving firstly to make it easy to fasten the energy absorbers on the seat plates by hooking and secondly to make it easy to put the wires into place by winding them tightly wound around the corresponding pulleys that are mounted to rotate freely on the seat back.

Furthermore, it should also be observed that the loop shape of a wire forming a given energy absorber leads to both strands of the wire being wound in at least one turn around the pulley. Those two strands of the wire work together when the energy absorber is put into operation, thereby balancing the forces supported by the pulley on its axis of rotation under the effect of the respective strands traveling around the pulley.

When the forces supported by a given seat plate are greater than said predefined force threshold, the wire travels around the pulley while deforming plastically, successively in bending and then relaxing, with such deformation of the wire providing the looked-for absorption of energy until the wire comes into abutment against the pulley as a result of said retaining means.

At the end of the energy absorption procured by the wire traveling around the pulley, the wire coming into abutment against the pulley as result of said retaining means enables the seat plate to be held against further downward tilting at the rear of the bench under the effect of the forces supported by the seat plate on which a passenger is sitting.

Such retention of the seat plate prevents its rear edge from separating from the bench as a result of the energy absorber being put into use.

In an astute embodiment, advantage is taken of the loop shape of the wire in order to form said retaining means. More particularly, said retaining means are formed by winding the wire around the pulley using a knot known as a cow hitch closed around the pulley at the distal end of the loop at the end of the stroke of the wire resulting from the energy absorber being put into operation.

Under such conditions, the energy absorbers are, in particular, free from any means that are elastically deformable in extension and/or in compression, which means are often expensive, bulky, and heavy. The individual arrangement of the energy absorbers proposed by the present invention makes it possible to limit the increase in the weight of the bench, which is provided for each of its passenger-receiving locations with at least two energy absorbers associated respectively with supporting two adjacent seat plates that together form a single location.

It should be observed that each of the seat plates can be supported individually by a single energy absorber. Nevertheless, an embodiment is preferred in which each seat plate is supported by at least two energy absorbers, in particular energy absorbers that are spaced apart from each other in the vicinity of the respective ends of the rear edge of a given seat plate.

Such provisions ensure that the seat plate is held stably with its general plane being kept oriented parallel to the front spar, with this applying regardless of any posture taken up by the passenger that might lead to different loads being applied to respective ones of the seat plates on which the passenger is sitting at the same time.

In an embodiment of the bench, the stand comprises at least two brackets, each having at least one catch for fastening the bench in its utilization station. The brackets together carry the front spar and the rear spar, and each has at least one front leg and at least one rear leg. In this context, said rear legs extend upwards towards the top of the seat back and they jointly carry at least one additional spar incorporated in the seat back.

Each shoulder strap of the set of harnesses is preferably engaged on an individual winder mounted on the seat back.

Furthermore, said rear legs jointly preferably carry an auxiliary spar overlying the winders. The auxiliary spar serves to guide the shoulder straps from the seat back towards the front of the bench, the rear spar guiding the lap strap from the seat back towards the front of the bench.

In this context, the rear spar, the additional spar and the auxiliary spar advantageously constitute members for taking up forces to which the bench is subjected.

More particularly, the rear spar supports the base of the seat back and takes up the forces transmitted to the bucket by the lap strap and by the stand. The additional spar and the auxiliary spar take up the forces transmitted to the bucket by the winders and by the shoulder straps and the forces transmitted by the energy absorbers and the stand.

In an embodiment of the bench, the front spar and the rear spar are connected together by cross-members forming an assembly enabling the seat pan to be tilted as a whole towards the seat back. In this context, the front spar is assembled to the stand via reversible fastener means, such as pins, for example, enabling the front spar to be separated from or alternatively connected to the stand quickly and easily.

The seat pan can be folded up as a whole towards the seat back in spite of being subdivided into a plurality of seat plates that are individually pivotally mounted on the front spar, by separating the front spar from the stand and by pivoting the seat pan around the rear spar by means of the cross-members.

These provisions are such that when the bench is not in use, the seat pan can be folded against the seat back in order to limit the overall space occupied by the bench, thereby making space available on board the aircraft.

It should be observed that since the seat plates are supported individually by the deformable energy absorbers, e.g. advantageously arranged as wires wound around said pulleys, the passenger safety provided by the energy absorbers does not impede folding the seat pan as a whole towards the seat back by pivoting the cross-members around the rear spar.

On this topic, it should be observed that causing the seat pan to pass from its position folded towards the seat back to its position suitable for the bench being used by one or more passengers can be performed without structural modification to the bench, and this applies in spite of the energy absorbers being engaged both with the seat plates and with the seat back.

In an embodiment, the front spar and the front legs are mounted to pivot relative to each other. The front legs are assembled to respective soleplates of the brackets via the reversible fastener means. Said soleplates are conventionally provided with catches for fastening the bench in the utilization station. In addition, the bench is preferably stayed between the front and the rear by means of the stand. For this purpose, the front legs and the rear legs have props connecting the front spar and the rear spar respectively to the soleplates.

In order to enable the passengers to understand quickly the various passenger-receiving locations that are made available to them on the bench, at least the seat back advantageously includes a visual marker identifying the individual locations for receiving the passengers. Said locations are individually identified by marking forming at least part of the visual marker, said marking visually identifying a group of two adjacent seat plates for all possible groups of two adjacent seat plates usable by a passenger for sitting on the bench.

For example, the visual marker comprises a marker made up of at least one set of strips visually separating the passenger-receiving locations of the bench situated respectively on either side of the strips and each having a first group of two adjacent and distinct seating plates from one of said passenger-receiving locations to the next situated on either side of the strips.

In addition, at least one strip of the set of strips points visually to an adjacent zone between two adjacent seating plates of a second group forming a passenger-receiving location, the seating plates of the second group comprising one seating plate from each of the first groups.

BRIEF DESCRIPTION OF THE SEVERAL VIEWS OF THE DRAWINGS

There follows a description of a preferred embodiment of the present invention given with reference to the figures of the accompanying sheets, in which.

DETAILED DESCRIPTION OF THE INVENTION

In order to clarify and facilitate reading the following description of the bench given with reference to the figures, common members of the bench shown in the various figures are identified therein with the same reference numbers and/or letters, without that implying that they are shown individually in all of the figures or that the reference numbers and/or letters identifying them are mentioned in all of the figures, in particular since some members may be masked by one or more other members of the bench, and/or in order to avoid overloading the figures, which would make them difficult to read.

Figures 1, 2:
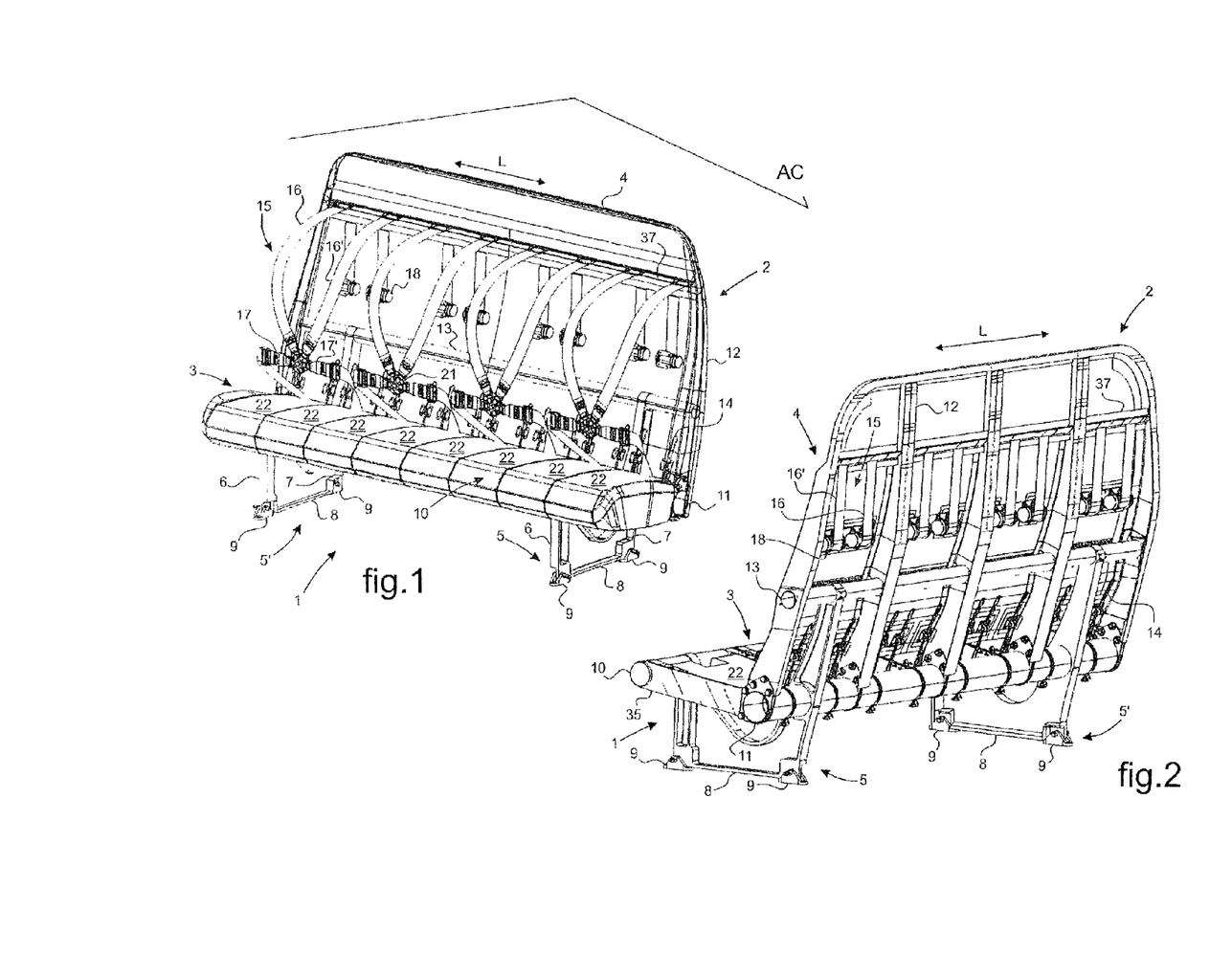
FIGS. 1 and 2 are perspective views of a preferred embodiment of a bench in accordance with the present invention, seen respectively from the front and from the rear of the bench.

In FIG. 1, reference AC designates an aircraft in accordance with the invention. In FIGS. 1 and 2, an aircraft bench in accordance with the present invention is shown respectively as seen from the front and as seen from the rear of the bench. The concepts "front" and "rear" are typically identified relative to the orientation of a passenger sitting on the bench in its utilization station.

The bench has a carrier structure 1 supporting a framework 2 constituting a bucket made up of a seat pan 3 and a seat back 4 forming a dihedral angle relative to each other. The bucket 3, 4 extends longitudinally in a longitudinally extending orientation L of the bench in order to receive a plurality of passengers simultaneously sitting side by side.

The carrier structure 1 comprises a stand 5, 5' made up of two longitudinally spaced-apart brackets 5 and 5'. Each bracket 5, 5' has a front leg 6 and a rear leg 7 connected together at the bottom by a soleplate 8 having catches 9 for fastening the bench in its utilization station on a floor of the aircraft AC. The carrier structure 1 also has spars carried by the stand 5, 5', being oriented parallel to the longitudinally extending orientation L of the bench. The spars carried by the stand 5, 5' comprise a front spar 10 carried by the front leg 6 and a rear spar 11 carried by the rear leg 7.

The frame 2 is mounted on the carrier structure 1 by means of the front spar 10, the rear spar 11, and extensions of the rear legs 7 extending upwards to the top of the seat back 4. The seat back 4 provided by the frame 2 is mounted on the rear spar 11 via uprights 12 incorporated in the seat back and via extensions of the rear legs 7 together carrying an additional spar 13 incorporated in the seat back 4.

The seat pan 3 provided by the frame 2 is pivotally mounted on the front spar 10 at its longitudinally extending front edge. The seat pan 3 is also supported by being suspended from energy absorbers 14 engaged firstly with the longitudinally extending rear edge of the seat pan 3 and secondly with the seat back 4 above the rear spar 11. Conventionally, the energy absorbers 14 serve to hold the seat pan 3 against forces to which the bucket 3, 4 is subjected and that are generated by at least one passenger received on the bench. Each energy absorber 14 is deformable as a result of the bucket 3, 4 being subjected to forces greater than a predefined force threshold.

Furthermore, the bench is fitted with a plurality of harnesses 15, the number of harnesses matching the optimum number of passengers who can be received simultaneously on the bench. Each harness 15 has four straps, comprising two shoulder straps 16, 16' and two lap straps 17, 17', together with a buckle 21 for locking the straps 16, 16', 17, 17' in position when the harness 15 is looped around a passenger.

The total number of harnesses 15 fitted to the bench, each comprising four straps 16, 16', 17, 17' and a buckle 21, defines the optimum number of passenger-receiving locations on the bench, such as the number four in the embodiment shown of the bench.

At this stage in the description, it should be observed that the straps 16, 16; 17, 17' of each harness 15 are arranged in two distinct sets of straps 16, 17, and 16', 17', each set comprising one shoulder strap 16, 16', and one lap strap 17, 17', said sets of straps being for looping around respective sides of the same passenger. Each strap 16, 17, 16', 17' of a harness 15 is anchored individually to the bench at a "distal" one of its ends. The shoulder straps 16, 16' of each harness 15 are preferably anchored to the bench via winders 18 mounted on the seat back 4, passing from the winders 18 to the front of the bench via an auxiliary spar 37 incorporated in the seat back 4.

In FIG. 1 more particularly, the seat pan 3 is subdivided into a plurality of adjacent seat plates 22 in the longitudinally extending orientation of the bench. Each seat plate 22 is individually mounted to pivot on the stand 5, 5' via its front edge by means of the front spar 10. The seat plates 22 are also individually supported by being suspended from their rear opposite edges by means of the energy absorbers 14. Each energy absorber 14 is allocated preferably in pairs to a given seat plate 22.

Figure 3:
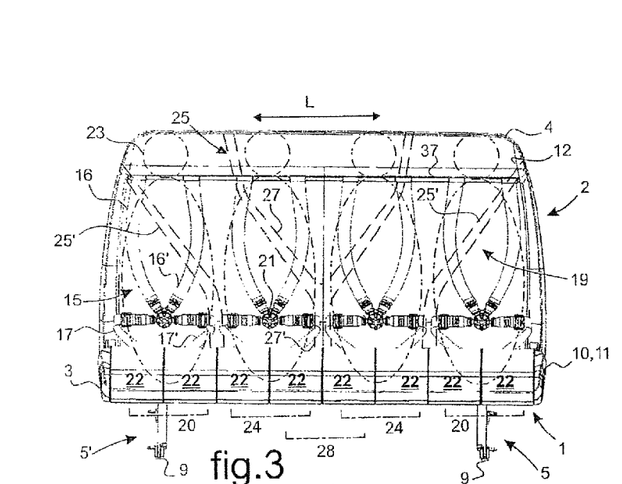
FIGS. 3 and 4 are face views of the bench shown in FIGS. 1 and 2, the bench receiving an optimum number of passengers in FIG. 3 and a smaller number of passengers in FIG. 4.
Figure 4:
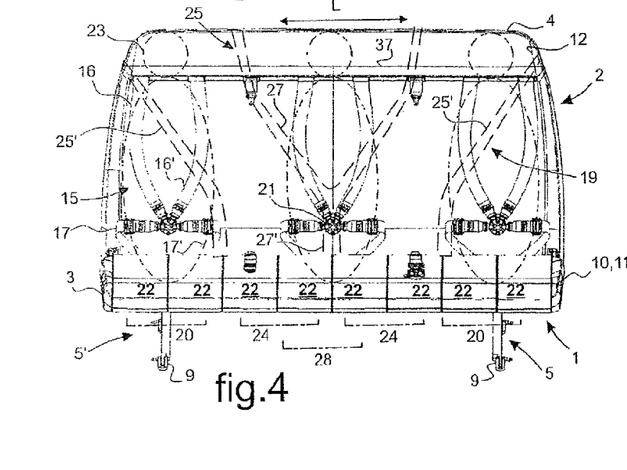

With reference to FIGS. 3 and 4, each individual location for receiving a passenger 23 of the aircraft AC on the bench is defined by two adjacent seat plates 22 that receive respective buttocks of the passenger 23. In the bench embodiment shown, there is an even number $N_1$ of seat plates 22 equal to eight. The number $N_1$ of seat plates 22 defines the optimum number $N_2$ of passengers 23 that can be received by the bench, where the number $N_2$ is equal to $N_1/2$, i.e. four passengers 23, as shown in a first configuration for receiving passengers 23 on the bench as shown in FIG. 3.

Nevertheless, by subdividing the seat pan 3 into seat plates 22 that, in pairs, define respective locations for receiving a passenger 23, it is possible to install a plurality of passengers 23 on the bench in a second configuration for receiving passengers 23 on the bench. In this second passenger-receiving configuration, the number $N_3$ of passengers 23 is odd, being equal to three, as shown in FIG. 4.

In the second configuration for receiving passengers 23 on the bench, the passengers 23 are spaced apart from one another by a distance equivalent to one seat plate 22, thereby providing the passengers 23 with spatial comfort at their sides.

Such spatial comfort is obtained without structurally modifying the bench, where that might require the passengers 23 to take specific action on a member of the bench, other than the usual action of passengers belting themselves into place by means of respective harnesses 15 by locking the straps 16, 16', 17, 17' to the buckle 21.

In order to make it easier for passengers 23 to be guided spontaneously to one or another passenger-receiving location of the bench as defined depending on the passenger-receiving configuration selected by the passenger(s) 23, the seat back 4 of the bench includes a visual marker 19 identifying each of the passengers receiving locations defined by the bench.

The visual marker 19 comprises in particular marking in the form of strips 25, 25' visually identifying a group of two adjacent seat plates 22, with this applying for all possible groups of two adjacent seat plates 22. In the embodiment of the visual marker 19 shown, the marking comprises two end strips 25' arranged at the respective longitudinal ends of the seat back 4 and a middle strip 25.

The end strips 25' are arranged as respective broken segments, said broken segments co-operating with respective longitudinal end edges of the bench to identify locations for receiving a passenger 23 that are referred to as end locations 20. The middle strip 25 is arranged as a Y-shape, with its top branches 27 co-operating with the end strips 25' to define two locations 24 for receiving a passenger 23 that are respectively adjacent of the end locations 20.

The bottom branch 27' of the middle strip 25 points visually to a location 28 for receiving a passenger 23 that is formed in the middle zone of the bench, being spaced apart from each of the end locations 20 by a respective seat plate 22.

Nevertheless, there then arises the problem of each passenger 23 being individually belted in by a respective harness 15. All of the passengers 23 installed on the bench need to be belted in individually, regardless of which one of the first and second passenger-receiving configurations is being used for the bench.

In the first configuration shown in FIG. 3, the $N_2$ passengers 23 can be belted in individually by respective harnesses 15 by using all of said sets of straps (16, 17); (16', 17') making up in pairs respective harnesses 15.

In the second configuration shown in FIG. 4, the $N_3$ passengers 23 can be belted in individually by making use appropriately of two adjacent sets of straps (16, 17); (16', 17') coming respectively from two adjacent harnesses 15 used in the first configuration.

More particularly, in FIG. 4, two passengers 23 installed that the respective longitudinal ends of the bench make use respectively of two harnesses 15 in accordance with the first configuration. A passenger 23 installed in the middle zone of the bench makes use of two adjacent sets of straps (16, 17); (16', 17') coming from two adjacent harnesses 15 that can be used in the first configuration, together with the buckle 21 of one or the other of said two adjacent harnesses 15.

Figure 5:
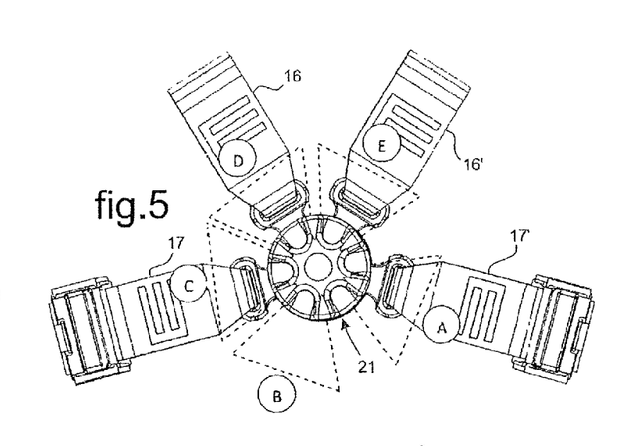
FIGS. 5 and 6 are detail views of the bench shown in FIGS. 1 to 4, showing a buckle of harness fitted to the bench in two respective utilization positions depending on the locations of the bench that receive passengers.
Figure 6:
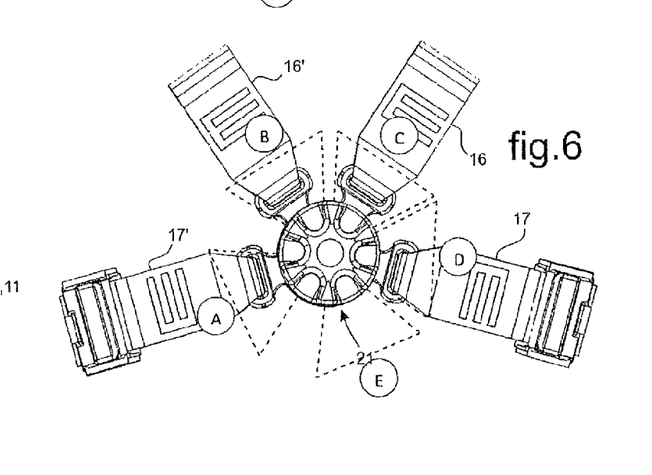

To this end, in an aircraft AC, the harnesses 15 as shown in FIGS. 5 and 6 have the buckles 21 of each of the harnesses 15 in the form of a buckle 21 having five locking points A, B, C, D, E represented by respective dashed-line polygons, each of generally triangular shape.

A permanent locking point A permanently locks a lap strap 17' of a harness 15 referred to as the "first" harness. Four temporary buckles B, C, D, E are then used selectively in order to belt in a passenger with varying arrangements of three temporary buckles B, C, D, E in particular using the following potential arrangements:

either by temporarily locking the other straps 17, 16, 16' of the first harness 15, as shown in FIG. 5, using the locking points C, D, E of the buckle 21. The harnesses 15 can then be used for all of the locations 20, 24 defined in said first passenger-receiving configuration or for the end locations 20 defined in said second passenger-receiving configuration;

or else by temporarily locking the shoulder strap 16' of the set of straps 16', 17' of the first harness 15 having its lap strap 17' permanently locked to the buckle 21, and by temporarily locking the straps 17, 16 of the set of straps adjacent to said first harness 15 to the buckle 21, as shown in FIG. 6. Under such circumstances, middle harnesses 15 located between the end harness 15 used for said end locations 20 are used in halves only in order to belt in the passenger 23 installed on the bench in the middle passenger-receiving location 28, when the bench is being used in said second configuration.

Naturally, such passenger-receiving configurations are mentioned purely as main examples, the modularity of the bench with respect to other passenger-receiving configurations enable other combinations to be used with two adjacent seat plates per passenger.

In FIGS. 7 to 10, the energy absorbers 14 are formed by respective wires 29 that are looped. The wire 29 is engaged firstly at its proximal end by hooking the loop over a hook 30 (visible in FIGS. 9 and 10) provided on the rear edge of a given seat plate 22, and secondly to the seat back 4 via a pulley 32 that is mounted to rotate freely on a bearing 31 supported by the seat back 4, with the wire 29 being wound closely around the pulley 29.

Figure 7:
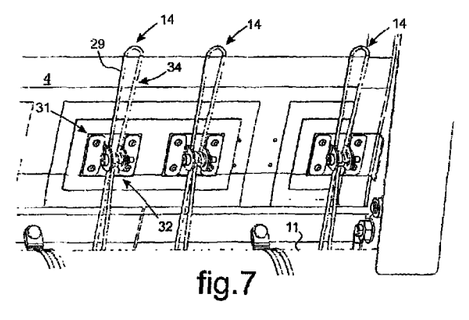
FIGS. 7 and 8 are detail views of the bench shown in FIGS. 1 to 4, showing energy absorbers fitted to the bench respectively in the common utilization position of the bench in FIG. 7, and in the passenger protection position in FIG. 8.
Figure 8:
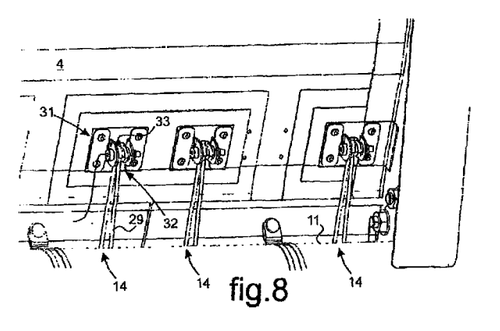
Figure 9:
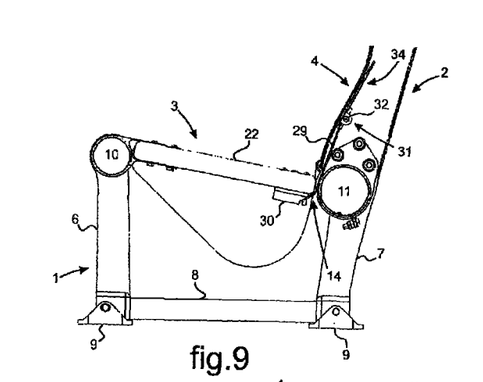
FIGS. 9 and 10 are side views of the bench shown in FIGS. 1 to 4, respectively in the common utilization position of the bench in FIG. 9, and in the passenger protection position in FIG. 10.
Figure 10:
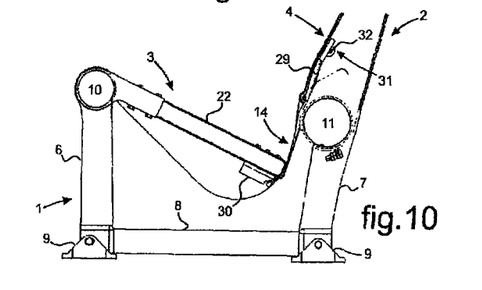

In FIGS. 7 and 9, the bench is in a common utilization position in the absence of any strong deceleration of the aircraft AC. In FIGS. 8 and 10, the bench is in a situation for protecting passengers 23 as a result of strong deceleration of the aircraft AC causing the energy absorbers 14 that are engaged with the seat plate 22 occupied by the passenger(s) to be actuated.

More particularly in FIGS. 7 and 9, winding the wire around the pulley 32 holds the wire 29 in a predefined position that serves to retain the seat plate 22 in the absence of strong deceleration of the aircraft. In this predefined position of the wire 29, a reserve 34 of wire 29 is provided between the pulley 32 and the distal end of the loop formed by the wire 29.

In FIGS. 8 and 10, the bucket 3, 4 has been subjected to forces above a predefined force threshold, as conventionally happens in the event of strong deceleration of the aircraft.

Under such circumstances, under the effects of the forces supported by the seat plates 22, the wire 29 fixed to a given seat plate 22 travels around the pulley 32 becoming bent and relaxed in succession, thereby having the effect of providing the energy absorption needed for protecting the passenger installed on the seat plate 22. It should be observed that said reserve 34 of wire 29 determines the tilting stroke traveled by the seat plate 22 until the distal end of the loop formed by the wire 29 comes into abutment against the pulley 32.

At the end of the stroke of the wire 29, as shown in FIG. 8, the winding of the wire 29 around the pulley 32 provides retaining means 33 for retaining the wire 29 that are constituted by a knot known as a "cow hitch". Such a knot serves to avoid the wire 29 escaping from the pulley 32 and consequently ensures that the seat plate 22 is held in order to support the passenger. More particularly, and in particular with reference to FIGS. 9 and 10 in succession, a change in the engagement distance of the wire 29 on the bench, between the wire 29 engaging the seat plate 22 and the wire 29 engaging the seat back 4, enables the seat plate 22 to tilt downwards at the rear of the bench, by the seat plate 22 pivoting about the front spar 10.

Such provisions serve to provide the passengers 23 installed on two given adjacent seat plates 22 with individual protection, in spite of a plurality of passengers 23 being installed on the seat pan 3 of the bench which is pivotally hinged as a whole on the front spar 10 and which presents a substantially continuously plane for installing the passengers 23 on the bench.

Figure 11:
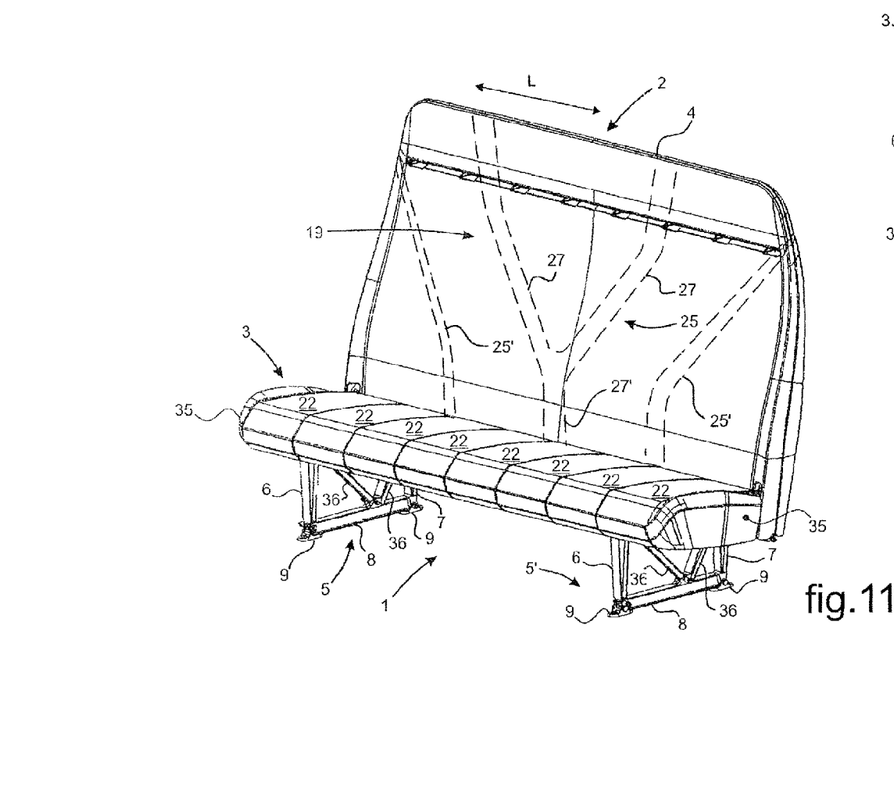
FIGS. 11 and 12 are perspective views of the bench shown in FIGS. 1 to 4 as seen from in front, respectively in its common utilization position in FIG. 11, and in its position with the seat pan folded up against the seat back of the bench in FIG. 12.
Figure 12:
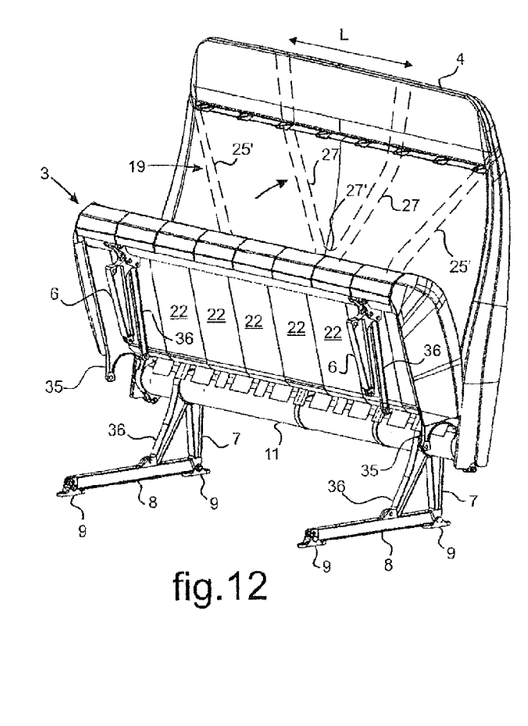

In FIGS. 11 and 12, in the aircraft AC of the invention, the seat pan 3 of the bench is shown folded up towards the seat back 4 away from said common utilization position of the bench as shown in FIG. 11 towards a generally folded position of the seat pan 3 against the seat back 4 as shown in FIG. 12. For this purpose, the front spar 10 and the rear spar 11 are connected together by cross-members 35, including at least two end cross-members placed at the respective longitudinal ends of the seat pan 3. The cross-members 35 together carry the front spar 10 and they are pivotally hinged to the rear spar 11.

The front spar 10 is assembled to the stand 5, 5' by easily reversible fastener means, such as pins, so that the front spar 10 can be separated from the stand 5, 5' so as to allow the seat pan 3 to tilt against the seat back 4, as shown in FIG. 12.

More particularly, the bench is stayed between the front and the rear by means of the stand 5, 5', as in the embodiment shown. The front leg 6 and the rear leg 7 of each bracket 5, 5' are provided with props 36 respectively connecting the front spar 10 and the rear spar 11 to a soleplate 8 of a given bracket 5, 5' fitted with said catches 9. The front spar 10 is mounted to pivot on the front legs 6 which are themselves fastened to the soleplate 8 via said reversible fastener means, so as to allow the front legs 6 to be folded under the seat pan 3 when the seat pan 3 is folded against the seat back 4 by means of relative pivoting movement between the front legs 6 and the front spar 10.

What is claimed is:

1. An aircraft bench comprising:
a carrier structure supporting a frame providing a bucket formed by a seat pan and a seat back, the bucket having a predefined plurality of individual locations for receiving passengers, the carrier structure comprising a stand having catches for fastening the bench in its utilization station and spars, including a front spar situated at the front of the bench in the utilization station and a rear spar situated at the rear of the bench in the utilization station, the front spar and the rear spar each being mounted on the stand, the frame being pivotally mounted on the carrier structure at least by means of the seat pan pivotally mounted on the stand via the front spar;
a plurality of harnesses, the number of harnesses corresponding to the optimum number of passengers who can be received simultaneously by the bench, each harness comprising at least four straps including two shoulder straps and two lap straps, each of the straps being anchored to the bench at one of its ends and each being lockable at its opposite end to a buckle at predefined locking points so as to loop a harness around a passenger;
a plurality of energy absorbers engaged on the frame, the energy absorbers serving to retain at least the seat pan in the event of the aircraft accelerating strongly against the forces to which the bucket is subjected and generated by at least one passenger received by the bench, each energy absorber being deformable as a result of the forces to which the bucket is subjected exceeding a predefined force threshold;
wherein:
the seat pan is subdivided along the general extent of the front spar into a plurality of adjacent seat plates, two adjacent seat plates together providing an individual location for receiving a passenger by receiving respective individual buttocks of the passenger;
each seat plate is individually mounted to move in pivoting on the carrier structure, each seat plate being firstly individually pivotally mounted on the stand at its front edge via the front spar, and secondly being individually supported in suspension at its opposite rear edge by at least one energy absorber; and
considering a distribution of the straps of each of the harnesses as two distinct sets of straps, each comprising a shoulder strap and a lap strap, each set of straps serving to belt in a passenger on a respective one of the passenger's sides, the straps of a middle set of straps that are placed adjacent between any two sets of straps referred to as neighboring sets are jointly lockable to a common buckle, selectively with one or the other of the neighboring sets of straps by means of respective combinations of locking points (ABCD; ABCD) of the buckle that are identified depending on the relative positions between the sets of straps co-operating with the same buckle;
the various sets of straps co-operating in pairs with a common buckle depending on the locations selected by the passengers, each of which has two adjacent seat plates, three successively adjacent seating plates defining in pairs two passenger-receiving locations, and three successively adjacent sets of straps used in respective pairs for belting in a passenger on respective sides being suitable for belting in a passenger regardless of the location selected by the passenger making use of any two adjacent seat plates.

2. An aircraft bench according to claim 1, wherein each of the buckles has a set of five locking points, including:
a "permanent" locking point for permanently locking one of the straps of any one of the sets of straps referred to as the "first" set to the buckle; and
four "temporary" locking points (B, C, D, E) for temporarily locking the other strap of the first set of straps and the straps of either one of the sets of straps adjacent to the first set of straps selectively to the buckle in the position for looping a harness around a passenger, the locking taking place via three temporarily locking points (C, D, E; B, C, D) respectively identified depending on the relative position of the sets of straps used for belting in the passenger.

3. A bench according to claim 1, wherein each energy absorber comprises a wire closed in a loop and wound closely between the ends of said loop formed by the wire around a pulley rotatably mounted on a bearing fastened to the seat back;
wherein a "proximal" one of the ends of the loop is fastened to the seating plate associated with the wire, with the "distal" other end of the loop being free and being arranged above said pulley in the absence of the wire supporting forces below said force threshold determining when the energy absorber is put into use; and
wherein the wire is provided with retaining means for retaining the distal end of the loop against the pulley at the end of the stroke of the wire caused by the energy absorber being put into operation as a result of the forces to which the seating plates is subjected in the event of strong deceleration of the aircraft.

4. A bench according to claim 3, wherein said retaining means are formed by winding the wire around the pulley using a knot known as a cow hitch closed around the pulley at the distal end of the loop at the end of the stroke of the wire resulting from the energy absorber being put into operation.

5. A bench according to claim 1, wherein the stand comprises at least two brackets, each having at least one catch for fastening the bench in its utilization station, the brackets together carrying the front spar and the rear spar, and each having at least one front leg and at least one rear leg, and wherein said rear legs extend upwards towards the top of the seat back and they jointly carry at least one additional spar incorporated in the seat back.

6. A bench according to claim 1, wherein each shoulder strap of the set of harnesses is engaged on an individual winder mounted on the seat back.

7. A bench according to claim 5, wherein said rear legs jointly carry an auxiliary spar overlying the winders and guiding the shoulder straps from the seat back towards the front of the bench, the rear spar guiding the lap strap from the seat back towards the front of the bench.

8. A bench according to claim 7, wherein the rear spar, the additional spar and the auxiliary spar constitute members for taking up forces to which the bench is subjected the rear spar supporting the base of the seat back and taking up the forces transmitted to the bucket by the lap strap and by the stand, the additional spar and the auxiliary spar taking up the forces transmitted to the bucket by the winders and by the shoulder straps and the forces transmitted by the energy absorbers and the stand.

9. A bench according to claim 1, wherein the front spar and the rear spar are connected together by cross-members providing an assembly for overall tilting of the seat pan towards the seat back, the front spar being assembled to the stand by reversible fastener means allowing the front spar to be separated from the stand, the seat pan being foldable as a whole towards the seat back by separating the front spar from the stand and by pivoting the seat pan about the rear spar by means of the cross-members.

10. A bench according to claim 9, wherein the front spar and a pair of front legs are mounted to pivot relative to each other, the pair of front legs being assembled to respective soleplates of the brackets via the reversible fastener means, said soleplates being provided with catches for fastening the bench in the utilization station.

11. A bench according to claim 10, wherein the bench is stayed between the front and the rear by means of the stand, the pair of front legs and a pair of rear legs having props connecting the front spar and the rear spar respectively to the soleplates.

12. A bench according to claim 1, wherein at least the seat back includes a visual marker identifying individual locations for receiving the passengers, said locations being individually identified by a marking forming at least part of the visual marker, said marking visually identifying a group of two adjacent seat plates for all possible groups of two adjacent seat plates.

13. A bench according to claim 12, wherein the visual marker comprises at least one set of strips:
visually separating the passenger-receiving locations of the bench situated respectively on either side of the strips and each having a first group of two adjacent and distinct seating plates from one of said passenger-receiving locations to the next situated on either side of the strips; and
pointing visually to an adjacent zone between two adjacent seating plates of a second group forming a passenger-receiving location, the seating plates of the second group comprising one seating plate from each of the first groups.

14. An aircraft including at least one bench, the bench comprising:
a carrier structure supporting a frame providing a bucket formed by a seat pan and a seat back, the bucket having a predefined plurality of individual locations for receiving passengers, the carrier structure comprising a stand having catches for fastening the bench in its utilization station and spars, including a front spar situated at the front of the bench in the utilization station and a rear spar situated at the rear of the bench in the utilization station, said front spar and said rear spar each being mounted on the stand, the frame being pivotally mounted on the carrier structure at least by means of the seat pan pivotally mounted on the stand via the front spar;
a plurality of harnesses, the number of harnesses corresponding to the optimum number of passengers who can be received simultaneously by the bench, each harness comprising at least four straps including two shoulder straps and two lap straps, each of the straps being anchored to the bench at one of its ends and each being lockable at its opposite end to a buckle at predefined locking points (A, B, C, D, E) so as to loop a harness around a passenger;
a plurality of energy absorbers engaged on the frame, the energy absorbers serving to retain at least the seat pan in the event of the aircraft accelerating strongly against the forces to which the bucket is subjected and generated by at least one passenger received by the bench, each energy absorber being deformable as a result of the forces to which the bucket is subjected exceeding a predefined force threshold;

wherein:

the seat pan is subdivided along the general extent of the front spar into a plurality of adjacent seat plates, two adjacent seat plates together providing an individual location for receiving a passenger by receiving respective individual buttocks of the passenger;

each seat plate is individually mounted to move in pivoting on the carrier structure, each seat plate being firstly individually pivotally mounted on the stand at its front edge via the front spar, and secondly being individually supported in suspension at its opposite rear edge by at least one energy absorber;

considering a distribution of the straps of each of the harnesses as two distinct sets of straps, each comprising a shoulder strap and a lap strap, each set of straps serving to belt in a passenger on a respective one of the passenger's sides, the straps of a middle set of straps that are placed adjacent between any two sets of straps referred to as neighboring sets are jointly lockable to a common buckle, selectively with one or the other of the neighboring sets of straps by means of respective combinations of locking points (ABCD; ABCD) of the buckle that are identified depending on the relative positions between the sets of straps co-operating with the same buckle;

the various sets of straps co-operating in pairs with a common buckle depending on the locations selected by the passengers, each of which has two adjacent seating plates, three successively adjacent seat plates defining in pairs two passenger-receiving locations, and three successively adjacent sets of straps used in respective pairs for belting in a passenger on respective sides being suitable for belting in a passenger regardless of the location selected by the passenger making use of any two adjacent seat plates.

15. An aircraft according to claim 14, wherein the aircraft is a rotorcraft.

* * * * *